United States Patent [19]

Raley et al.

[11] 4,317,792
[45] Mar. 2, 1982

[54] PROCESS FOR PRODUCING PERFORATED FILM

[75] Inventors: Garland E. Raley; James M. Adams, both of Terre Haute, Ind.

[73] Assignee: Ethyl Corporation, Richmond, Va.

[21] Appl. No.: 141,326

[22] Filed: Apr. 18, 1980

Related U.S. Application Data

[62] Division of Ser. No. 68,910, Aug. 23, 1979, Pat. No. 4,252,516, which is a division of Ser. No. 909,112, May 24, 1978, abandoned.

[51] Int. Cl.³ .............................................. B29C 17/14
[52] U.S. Cl. .................................. 264/504; 264/154; 264/DIG. 70
[58] Field of Search ....... 264/145, 147, 154, DIG. 47, 264/DIG. 70, 504

[56] References Cited

U.S. PATENT DOCUMENTS

| 3,038,198 | 6/1962 | Schaar | 264/DIG. 70 |
| 3,394,211 | 7/1968 | MacDuff | 264/154 |
| 3,682,760 | 8/1972 | Fairbanks | 264/167 |
| 4,151,240 | 4/1979 | Lucas et al. | 264/154 |

FOREIGN PATENT DOCUMENTS 233019  5/1959  Australia .............................. 264/504

*Primary Examiner*—James B. Lowe
*Attorney, Agent, or Firm*—Donald L. Johnson; John F. Sieberth; Edgar E. Spielman, Jr.

[57] ABSTRACT

A process for the manufacture of thermoplastic sheet having elliptical perforations including a rotatable molding element having a series of hexagonal-shaped depressions having centered therein elliptical holes, the elliptical holes having a major axis and a minor axis, the major axis being oriented parallel to the direction in which the molding element is rotated, a means for applying a fluid pressure differential to a surface of the thermoplastic sheet to force the sheet against the molding element to effect rupturing of the sheet and the formation of elliptical holes in the sheet.

5 Claims, 5 Drawing Figures

PROCESS FOR PRODUCING PERFORATED FILM

This is a division of application Ser. No. 68,910, filed Aug. 23, 1979, now U.S. Pat. No. 4,252,516, which is in turn a division of application Ser. No. 909,112, filed May 24, 1978, now abandoned.

BACKGROUND OF THE INVENTION

The present invention relates to thermoplastic sheet products and to a method and apparatus for their manufacture. More particularly, the invention is related to a method and apparatus for perforating a continuous sheet or film of thermoplastic material to produce film having increased strength and reduced edge curl.

Perforated thermoplastic sheets have many useful applications. Perforated sheets are used in gardening and farming to prevent the growth of grass and other weeds while permitting more moisture to be transmitted through the sheet to the soil beneath the sheet. Perforated sheets are also used for making disposable baby diapers. U.S. Pat. No. 3,814,101 discloses diapers employing perforated thermoplastic sheets which permit the flow of liquid in the direction of the absorbent material in the diaper but substantially reduce the possibility of flow in the opposite direction.

SUMMARY OF THE INVENTION

In accordance with the present invention there is provided a process and apparatus for manufacture of thermoplastic sheet products having elliptical perforations, the process including placing a thermoplastic sheet into contact with a continuously rotating molding element having a series of elliptical holes therein in which the major axis of the elliptical holes is oriented parallel to the direction in which the molding element is rotating, subjecting a surface of the thermoplastic sheet to the action of a fluid pressure differential to cause the material to flow into the elliptical holes of the molding element, maintaining the pressure differential to effect rupturing of the thermoplastic sheet and the formation of elliptical holes in the sheet, and continuously removing the molded portions of the thermoplastic sheet from the molding element. The apparatus for the manufacture of thermoplastic sheet products having elliptical holes therein includes a rotating molding element having a series of elliptical holes therein in which the major axis of the ellipse is oriented parallel to the direction in which the molding element is rotating.

DESCRIPTION OF THE PREFERRED EMBODIMENTS

Figure 1:
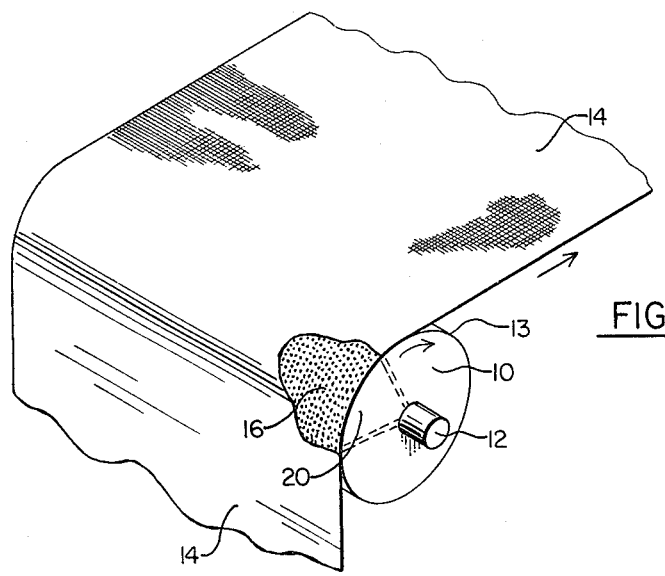
FIG. 1 shows a perspective, partially cut-away schematic view of a portion of the apparatus employed in the present invention.

Referring now to FIG. 1, a stationary cylindrical drum 10 is shown supported by a centrally disposed support or axle 12. The outer cylindrical surface 13 of drum 10 is preferably formed of highly polished metal but may be made of any other material having a relatively low coefficient of friction. A molding element or screen 16, having edge 16a, is mounted around surface 13 of drum 10 and is adapted to be rotated freely thereon. Molding element 16 may be formed as an integral unit in the shape of a cylinder and adapted to be slipped on drum 10 from an end thereof or it may be wrapped around drum 10 and then secured in any suitable manner. Thus, axle 12 forms the centerline about which molding element 16 rotates. For the purpose of rotating element 16, a gear drive may be employed which is adapted to mesh with gearing provided on the element itself, or a pulley drive may be connected to the molding element by means of caps provided on the ends thereof. If desired, element 16 could be rigidly attached to drum 10 and the entire drum could be rotated, thereby rotating element 16.

Figure 2:
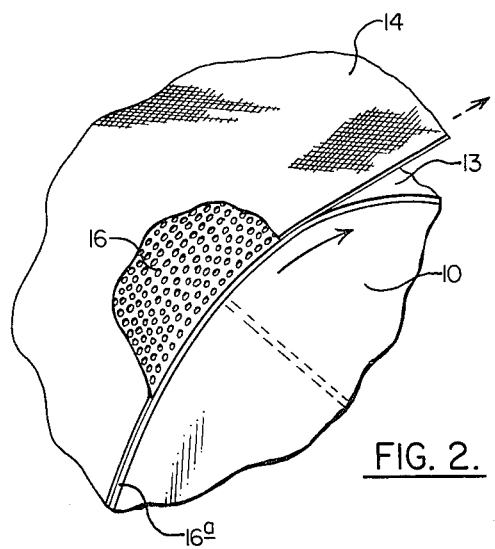
FIG. 2 is an enlarged, partially cut-away section of FIG. 1.
Figure 3:
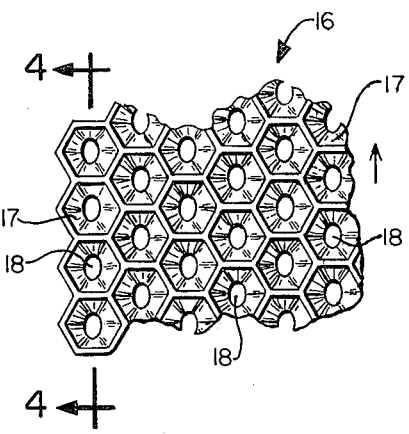
FIG. 3 is an enlarged, plan view of the molding element of FIGS. 1 and 2.
Figure 4:
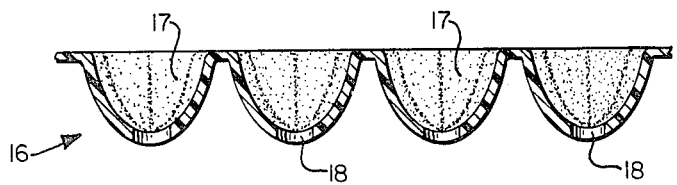
FIG. 4 is a cross-sectional view taken along lines 4—4 of FIG. 3.
Figure 5:
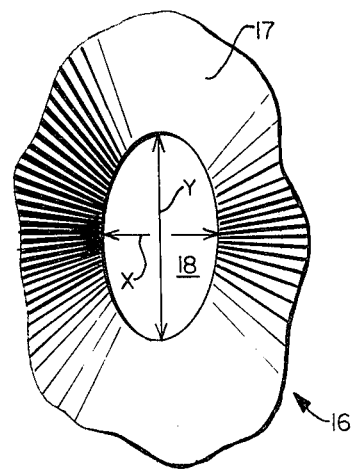
FIG. 5 is a cut-away, enlarged view of one of the elliptical holes shown in FIG. 3.

To form the film perforated in accordance with the present invention, it is necessary that the molding element pattern depicted in FIG. 3 be employed. The molding element pattern of FIGS. 3 thru 5 can be seen to be a series of generally hexagonal-shaped depressions 17 attached at their edges. The hexagonal depressions have elliptical-shaped holes 18 centered therein and sloping sidewalls 17a as seen in FIG. 4. The holes 18 are elliptical in shape and oriented so that the major axis "Y" is parallel to the direction of rotation of the molding element, the direction of rotation being indicated by the arrows "D" in FIGS. 1 thru 3, and 5. The minor axis "X" of the ellipse is oriented in a direction perpendicular to the direction of rotation of the molding element. Although the elliptical holes may be varied for particular types of film, the preferred elliptical hole 18 has a major axis "Y" with a length of from about 24 mils to about 26 mils and a minor axis "X" with a length of from about 17 mils to about 19 mils; most preferably, major axis "Y" has a length of 25 mils and minor axis "X" has a length of 18 mils.

To effect perforation of the thermoplastic sheet 14, a fluid pressure differential is applied to the surface of sheet 14 to cause the thermoplastic sheet 14 to flow into the hexagonal depressions 17 and onward through elliptical holes 18 to thereby rupture and form elliptical holes in the film. The pressure differential may be created by employing a vacuum chamber 20 in drum 10 on the underside of molding element 16 by any means well-known in the art. An example of a typical chamber is shown in U.S. Pat. No. 3,054,148, which is hereby incorporated by reference. The vacuum 20 is schematically represented in FIGS. 1 and 2 by dotted lines.

The thermoplastic sheet 14 may be heated prior to contacting molding element 16 if desired or if necessary to effect rupture, and molding element 16 may be heated to further soften the film if desired. Furthermore, conventional cooling means may be used to cool film 14 after the film has been perforated.

Any flexible thermoplastic material which may be formed into flexible film or sheets may be used in the production of the novel products of the present invention. Exemplary thermoplastic materials include cellulose esters, e.g., cellulose acetate, cellulose propionate, cellulose butyrate; mixed esters of cellulose; cellulose ethers, e.g., ethyl cellulose; nylon and polymeric materials, e.g., polyvinyl alcohol, polyvinyl alcohol acetals, polyvinyl chloride, polyvinyl chloride acetate, polystyrene, methyl methacrylate, polyethylene, polypropylene, and other polyolefins which may be formed into flexible sheet or film, and the like. Sheets made from such materials may be plasticized with suitable plasticizers depending on the physical characteristics of the material employed.

The perforated molding element 16 may be made of metal or any other suitable material. The molding element may be made from a metal sheet having the perforated design stamped or otherwise cut from the sheet. Furthermore, the perforation of the sheets may be provided by etching a plate that makes an elliptical hole.

Having fully described the invention, it is desired that it to be limited within the spirit and scope of the attached claims.

What is claimed is:

1. A process for the manufacture of thermoplastic sheet having elliptical perforations comprising:
   a. placing a thermoplastic sheet into contact with a continuously rotating molding element means having hexagonal-shaped depression means in which a series of elliptical hole means are centered, said hole means having a major axis and a minor axis, said major axis being oriented parallel to the direction in which said molding element means is rotating;
   b. subjecting a surface of said thermoplastic sheet to the action of a fluid pressure differential to cause said sheet to flow into said elliptical hole means while maintaining said pressure differential to effect rupturing of said thermoplastic sheet and the formation of elliptical hole means in said sheet; and,
   c. continuously removing the molded portions of said sheet from said molding element means.

2. The process of claim 1 wherein said thermoplastic sheet is heated to soften said sheet prior to said sheet coming into contact with said continuously rotating molding element means.

3. The process of claim 1 wherein said sheet means is cooled prior to removing said molded portions from said molding element means.

4. The process of claim 1 wherein said major axis has a length of from about 24 mils to about 26 mils and said minor axis has a length of from about 17 mils to about 19 mils.

5. The process of claim 1 wherein said major axis has a length of about 25 mils and said minor axis has a length of about 18 mils.

* * * * *

UNITED STATES PATENT AND TRADEMARK OFFICE
CERTIFICATE OF CORRECTION

PATENT NO. : 4,317,792
DATED : March 2, 1982
INVENTOR(S) : Garland E. Raley and James M. Adams It is certified that error appears in the above—identified patent and that said Letters Patent is hereby corrected as shown below:

Column 3, line 14, reads "it to be limited within...", should read -- it be limited only within... -- .

Signed and Sealed this

Third Day of August 1982

[SEAL]

Attest:

GERALD J. MOSSINGHOFF

*Attesting Officer*     *Commissioner of Patents and Trademarks*